Patented Feb. 14, 1928.

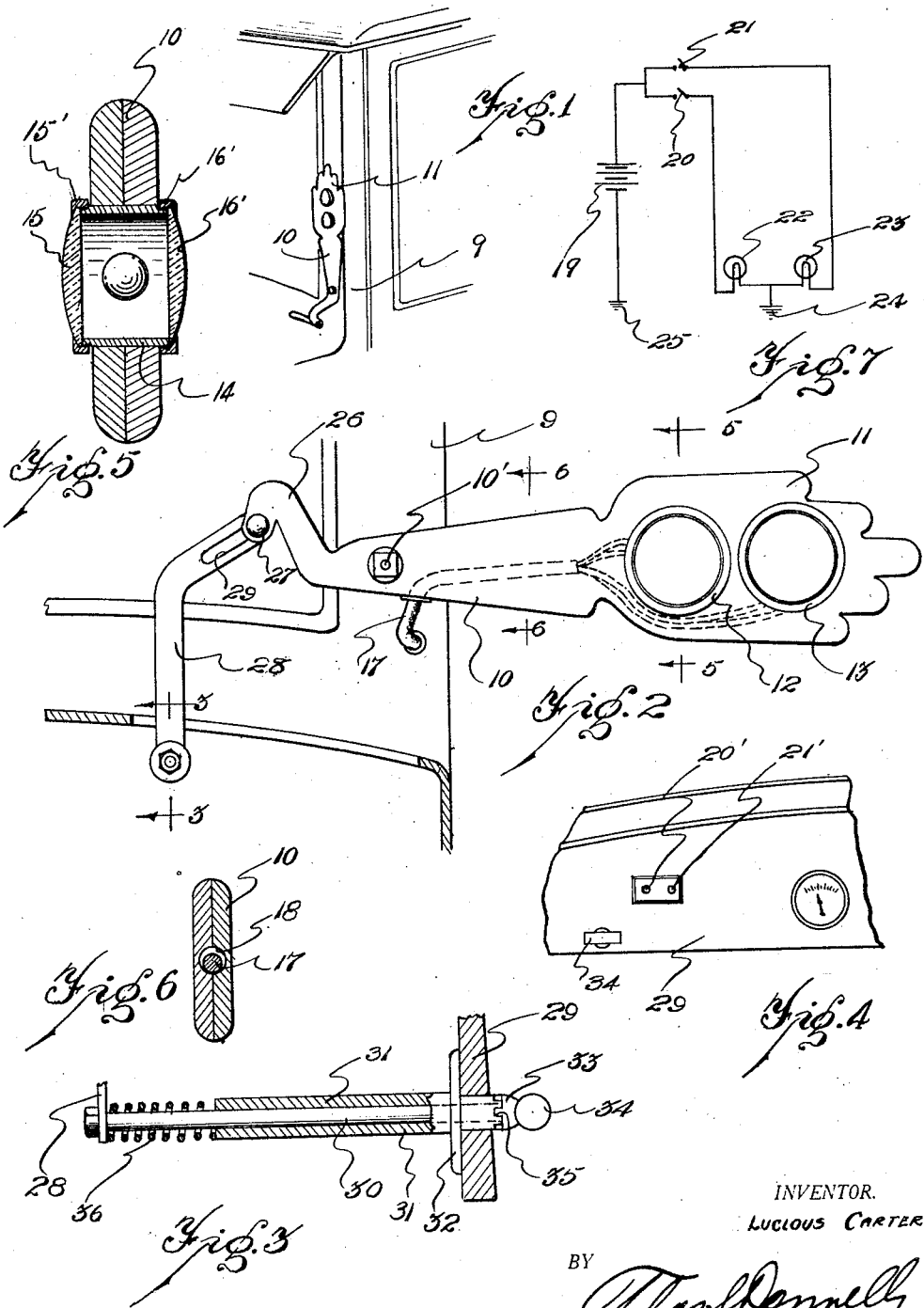

1,659,082

UNITED STATES PATENT OFFICE.

LUCIOUS CARTER, OF DETROIT, MICHIGAN.

VEHICLE HAND SIGNAL.

Application filed August 27, 1925. Serial No. 52,781.

My invention relates to a new and useful improvement in a vehicle hand signal adapted for use with vehicles of various kinds, particularly automobiles, and has for its object the provision of a mechanically operated hand-shaped member which may be projected outwardly from the side of the vehicle at will to indicate the intention of the driver to make some change in the operation of the vehicle.

Another object of the invention is the provision of a hand signal of this class having lights mounted therein which may be lit at will so as to be visible in the nighttime.

Another object of the invention is the provision in a hand signal of this class of a rockable lever, rockable by a longitudinally movable arm, which may be locked in either position of movement.

Other objects will appear hereinafter.

The invention consists in the combination and arrangement of parts hereinafter described and claimed.

The invention will be best understood from a reference to the accompanying drawings which form a part of this specification, and in which, Fig. 1 is a fragmentary perspective view of an automobile body embodying the invention, Fig. 2 is a side elevational view of the invention mounted on an automobile body shown in fragment, Fig. 3 is a sectional view taken on substantially line 3—3 of Fig. 2, Fig. 4 is a fragmentary front elevational view of the instrument board of the vehicle, Fig. 5 is a sectional view taken on substantially line 5—5 of Fig. 2, Fig. 6 is a sectional view taken on substantially line 6—6 of Fig. 2, Fig. 7 is a diagrammatic view illustrating the wiring used in the invention.

Swingably mounted on the bolt 10' which projects through a portion of the vehicle body 9, is an arm 10, which is provided at its outer end with a hand-shaped enlargement 11 having a pair of openings 12 and 13 formed therein. Mounted on each of these openings is a sleeve 14, closed at opposite sides by a lens 15 and 16, each secured in position by the respective retaining ring 15' and 16'. Mounted in each of the openings is a bulb 22 and 23, electrically connected by wires extending through the cable 17 to a battery 19, which is grounded at 25. As shown in Fig. 6, the arm 10 is provided with a bore or opening 18 formed therein to accommodate the cable 17. The battery is suitably connected to the bulbs 22 and 23, switches 20 and 21 being interposed between the bulbs 22 and 23 and the battery 19. Each of these bulbs is grounded, as at 24. As shown in Fig. 4, mounted upon the instrument board 29 are buttons 20' and 21', which may be used to open and close the switches 20 and 21 respectively. A goose-neck 26 projects from the inner end of the arm 10, and carries a stud 27 which is projected through a slot 29 formed in a bell crank or connecting link 28. This link 28 is fixedly mounted upon the rod 30, which is projected through the instrument board 29 and through a sleeve 31 carrying flange 32, which affords a means of attaching the sleeve 31 longitudinally immovable of the rod 30. The rod 30 is provided on its inner end with a head 33 having a handle 34 attached thereto The head 33 is, as shown in Fig. 3, provided with a number of tongues 35 adapted for seating in the notches formed in the end of the sleeve 31. Positioned on the rod 30 in embracing relation so as to engage at one end the inner face of the link 28 and at its opposite end the end of the sleeve 31, is a spiral spring 36, which tends normally to retain the tongues 35 in engagement with the notches. The structure is such that when the device is mounted as shown, the operator may by drawing the rod 30 inwardly against the tension of the spring 36 disengage the tongues 35 from the notches so as to permit a turning or rocking of the rod 30. This turning or rocking of the rod 30 will on account of the connection with the pin 27 in the slot 29, effect a rocking of the arm 10 to either vertically extending position or horizontal position. When it is desired to change the course of direction of the vehicle, the operator may by disengaging the tongues 35 from the notches and rocking the rod 30, move the hand in the position shown in Fig. 2. Sufficient of the notches are provided so that the tongues 35 may engage in these notches when the arm 10 is in the position shown in Fig. 2 or when it is in the position shown in Fig. 1. After movement to operative position, the operator will then close the circuit to the bulbs separately by operating the switch buttons 21' and 20'. The lenses may be colored, one of the lens being colored red and the other green, or such other colors as may be desired.

With a structure of this class, I have provided a vehicle hand signal which is durable in its structure and easily operated, while at the same time it is provided with a locking means securing it in either position of movement While I have illustrated and described the preferred form of construction, I do not wish to limit myself to the precise details of structure shown in the drawings, but desire to avail myself of such variations and modifications as come within the scope of the appended claims.

Having thus described my invention, what I claim as new and desire to secure by Letters Patent is:

1. A vehicle signal of the class described, adapted for use on a vehicle body, comprising a signal bearing arm pivotally mounted on said body and adapted upon movement in one position for projecting at end laterally outwardly from said body; a goose neck mounted on the opposite end of said arm; a connecting link pivotally connected at one end to said goose neck; a rockably mounted rod connected to the opposite end of said connecting link for moving said arm into operative and inoperative position at will, upon rocking.

2. A vehicle signal of the class described, adapted for use with a vehicle having a body and comprising a signal bearing arm pivotally mounted at one end adjacent to said body and adapted for, upon movement in one position, projecting at one end laterally outwardly from said body; a goose neck mounted on the opposite end of said arm; a connecting link angularly turned at one end and provided with an elongated slot connected to said goose neck; a horizontally extending rockable rod connected to the opposite end of said link and adapted upon rocking for swinging said link for effecting movement of said arm to operative and inoperative position at will.

3. A vehicle signal of the class described, adapted for use with a vehicle having a body and comprising a signal bearing arm; means for pivotally mounting said arm, adjacent one end, on said body; a goose neck portion on the opposite end of said arm; a connecting link angularly turned at one end and provided with an elongated slot; a pin projected through said goose neck and said elongated slot for movably connecting said end of said link and said goose neck; a horizontally extending rockably mounted arm fixedly connected to the opposite side of said link adapted, upon rocking movement, for rocking said goose neck bearing arm on its mounting; means for locking said rocking arm against rocking movement; and resilient means for normally retaining said locking means in operative relation.

4. A vehicle signal of the class described adapted for use with a vehicle having a body and comprising a signal bearing arm; means for pivotally mounting one end of said arm on said body; a goose neck portion on the opposite end of said arm; a connecting link pivotally connected at one end to said goose neck portion; a rockingly mounted rod fixedly connected to the opposite end of said link; a head mounted on said rod having a plurality of projections extending from one face thereof; a bearing for said rod provided at one end with a sleeve having a plurality of notches formed therein for engagement with said projections, said rod being non-rockable upon engagement of said projections in said recesses; and a spiral spring mounted on said rod normally retaining said projections in engagement with said recesses.

In testimony whereof, I have signed the foregoing specification.

LUCIOUS CARTER.